P. BECK.
RANGE FINDER.
APPLICATION FILED JULY 26, 1910.

981,968.

Patented Jan. 17, 1911.

UNITED STATES PATENT OFFICE.

PAUL BECK, OF MUNICH, GERMANY.

RANGE-FINDER.

981,968.   Specification of Letters Patent.   Patented Jan. 17, 1911.

Application filed July 26, 1910. Serial No. 573,946.

*To all whom it may concern:*

Be it known that I, PAUL BECK, citizen of Germany, residing at Munich, Bavaria, Germany, have invented certain new and useful Improvements in Range-Finders; and I do hereby declare the following to be a full, clear, and exact description of the invention, such as will enable others skilled in the art to which it appertains to make and use the same.

This invention relates to a range finder having a lens adjustable for measuring and rectifying purposes.

Range finders with two telescopes in which the objectives are parallelly and slidably arranged for measuring or rectifying purposes, that is to say, are guided and slidable in a small frame are well known. This sliding device is complicated and necessitates the frame and lens guide being very exactly made and occupies a proportionally large space; moreover, the usual or necessary focusing device must be located near the end of each telescope and is, therefore, not easily accessible. Further, the setting and focusing device for the lenses heavily loads the respective carrying tube and thus produces warping thereof and consequently inaccuracies in the indications or readings.

The present invention obviates the above stated inconveniences in a simple and effective manner by arranging the lenses eccentrically with regard to one another instead of slidable parallel to each other. When measuring or rectifying, the lens setting is turned through a suitable distance and thus produces the necessary displacement of the image. This method of adjusting the lenses has the advantage that the lens guide can be made on the lathe in an accurate and simple manner and that the whole device becomes extremely inexpensive. The focusing device may also be arranged near the center of the instrument which further facilitates the adjustment.

Figure 1:
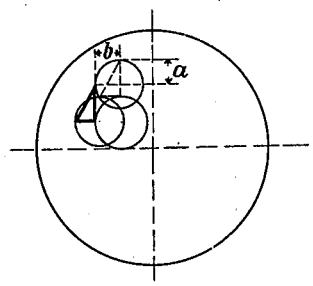
Figure 2:
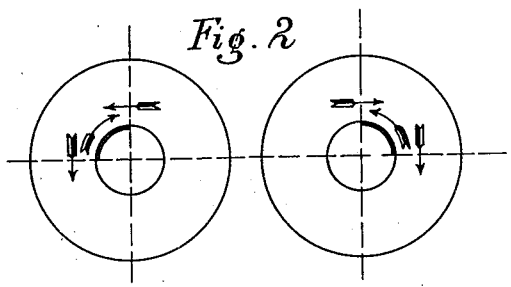
Figure 3:
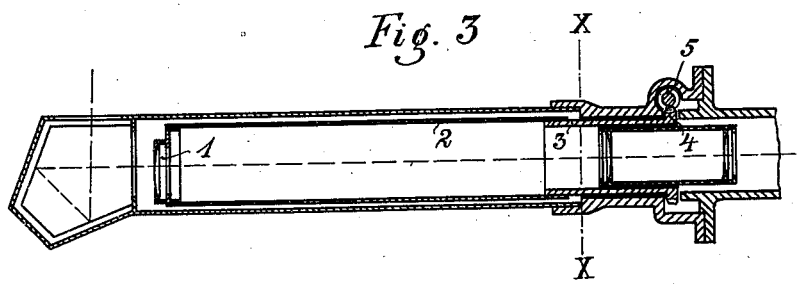

An embodiment of the invention is represented in the annexed drawing. Figure 1 being a diagram showing the respective positions of the lenses. Fig. 2 a diagram showing the direction of movement of the respective lenses. Fig. 3 a longitudinal section through a range finder having my invention applied thereto and Fig. 4 a similar view of a modification.

Figure 4:
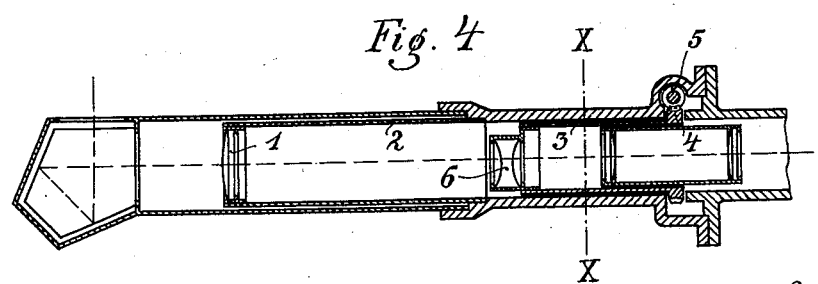

In the present invention the option is given to displace either the objective lens, as illustrated in Fig. 3, or a biconcave lens inserted between the objective lens and the ocular, as shown in Fig. 4.

Fig. 3 represents the left hand telescope of a range finder; 1 being the objective placed eccentrically in a tube 2 and caused by the tube 3, the worm wheel 4, the worm 5, or any other suitable mechanism, to be rotated within a small circle about the axis of the tube, whereby an image produced by the lens at the plane X X is displaced at this plane in a direction parallel to itself. The lens and image have in their motion a movement similar to that of a crank pivot with its bearing guided by an infinitely long connecting rod; the lens moving like the forward surface of the pivot and the image similarly to the forward surface of the bearing.

The diagram Fig. 1 illustrates the movement of the image represented in the form of a triangle, the angles of which move in circles of the radius of the eccentricity of the lens. In both positions the image is parallelly displaced in a horizontal direction for the distance $b$, and in vertical direction through the distance $a$.

According to the construction of the range finder as well as the principle of measuring, the movement can be produced in the one or other direction. Though unintentional displacement generally causes inaccuracies in certain cases, said inaccuracies would be of no importance.

In the second case a displacement of the image in one of the two telescopes is generally sufficient, whereas in the first case the inaccuracy must be corrected and this can be effected by an eccentric displacement of the lenses in both telescopes, as diagrammatically shown in Fig. 2.

The exterior circles limit the image surfaces, and the interior circles indicate the eccentric circles of the two telescopes. If the centers of the lenses are turned in a contrary direction through the segments indicated by heavy lines, the images approach each other in a horizontal direction, as indicated by arrows, whereas, both are proportionally raised in the vertical direction. No relative displacement of the images in a vertical direction, therefore, takes place, and the inaccuracy is thus removed by the vertical displacement of the image. According to the direction of rotation selected and the respective position of the lens devices, the images can be adjusted in the vertical or horizontal direction.

A modified form of construction is illustrated in Fig. 4 in which a biconcave lens 6 is inserted between the objective 1 and the ocular 6ª. Without mentioning the action of this lens with regard to the variation of the focal distance and the position of the essential points of the system, in this arrangement the displacement of the image can be effected by the lens 6 placed eccentrically in the tube 3 being rotated eccentrically about the axis of the telescope by a worm wheel 4 and worm 5 or other suitable mechanism.

The rectifying of unintentional displacements can be effected from one side by mechanism of various kinds which combine the rotatory movement of the two eccentric lenses.

What I claim as my invention and desire to secure by Letters Patent of the United States is:—

1. In a range finder the combination of a tubular member, an ocular carried thereby, a lens carrier mounted concentrically in said member, a lens supported in said carrier with its axis eccentric to the axis of said carrier and ocular and means for axially rotating the carrier whereby a displacement of the image is produced.

2. In a range finder the combination of a tubular member, an objective and ocular mounted concentrically in said member, a lens interposed between said objective and ocular and means for rotating said lens eccentrically with respect to the axes of the objective and ocular whereby a displacement of the image is produced.

In testimony whereof I hereunto affix my signature in the presence of two witnesses.

PAUL BECK.

Witnesses:
 A. V. W. COTTER,
 MATHILDE K. HELD.